(12) United States Patent
Kojima

(10) Patent No.: US 9,695,302 B2
(45) Date of Patent: Jul. 4, 2017

(54) RUBBER COMPOSITION FOR STUDLESS WINTER TIRES, AND STUDLESS WINTER TIRE

(75) Inventor: Ryoji Kojima, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 115 days.

(21) Appl. No.: 14/343,269

(22) PCT Filed: Jul. 20, 2012

(86) PCT No.: PCT/JP2012/068442
§ 371 (c)(1),
(2), (4) Date: Mar. 6, 2014

(87) PCT Pub. No.: WO2013/057993
PCT Pub. Date: Apr. 25, 2013

(65) Prior Publication Data
US 2014/0221525 A1    Aug. 7, 2014

(30) Foreign Application Priority Data

Oct. 18, 2011   (JP) ................. 2011-229000

(51) Int. Cl.
| C08L 7/00 | (2006.01) |
| C08L 9/00 | (2006.01) |
| B60C 1/00 | (2006.01) |
| C08L 91/00 | (2006.01) |

(52) U.S. Cl.
CPC ............ *C08L 7/00* (2013.01); *B60C 1/0016* (2013.04); *C08L 9/00* (2013.01); *C08L 91/00* (2013.01)

(58) Field of Classification Search
CPC combination set(s) only.
See application file for complete search history.

(56) References Cited

U.S. PATENT DOCUMENTS

| 6,013,737 | A | 1/2000 | Takagishi et al. | |
| 6,147,178 | A | 11/2000 | Nakamura et al. | |
| 2006/0173118 | A1 | 8/2006 | Hochi et al. | |
| 2006/0280925 | A1* | 12/2006 | Kim et al. | B60C 1/0016 428/296.4 |
| 2008/0314484 | A1 | 12/2008 | Nishioka et al. | |
| 2010/0184908 | A1* | 7/2010 | Kikuchi et al. | 524/526 |
| 2011/0046291 | A1 | 2/2011 | Kojima | |
| 2011/0112215 | A1* | 5/2011 | Kojima | B60C 1/0016 523/158 |
| 2011/0166254 | A1 | 7/2011 | Nishimura | |

FOREIGN PATENT DOCUMENTS

| CN | 1821293 | A | 8/2006 | |
| CN | 101993552 | A | 3/2011 | |
| EP | 1 958 984 | A1 | 8/2008 | |
| EP | 2014709 | A1 * | 1/2009 | ............... C08L 9/00 |
| EP | 2 184 318 | A2 | 5/2010 | |
| JP | 2008-101127 | A | 5/2008 | |
| JP | 2011-38057 | A | 2/2011 | |
| JP | 2011-94012 | A | 5/2011 | |
| JP | 2011-132305 | A | 7/2011 | |
| JP | 2011-132307 | A | 7/2011 | |
| JP | 2011-140547 | A | 7/2011 | |
| JP | 2011-144267 | A | 7/2011 | |

OTHER PUBLICATIONS

Full machine translation of JP 2008-101127.
Full machine translation of JP 2011-132305.
Full machine translation of JP 2011-132307.
Full machine translation of JP 2011-140547.
Full machine translation of JP 2011-144267.
Full machine translation of JP 2011-94012.
International Search Report issued in PCT/JP2012/068442 dated Sep. 25, 2012.

* cited by examiner

*Primary Examiner* — Nicole M Buie-Hatcher
(74) *Attorney, Agent, or Firm* — Birch, Stewart, Kolasch & Birch, LLP

(57) ABSTRACT

Provided are: a rubber composition for studless winter tires, achieving balanced improvement in performance on ice and snow, wet grip performance, and abrasion resistance; and a studless winter tire including a tread formed from the same. The rubber composition for studless winter tires includes: a rubber component including NR and BR; an aromatic oil; silica; and carbon black, wherein the combined amount of NR and BR is 30 mass % or more per 100 mass % of the rubber component; the amount of aromatic oil is 12-85 parts by mass per 100 parts by mass of the rubber component; the silica content is 45 mass % or more per 100 mass % in total of silica and carbon black; the silica includes at least one silica (1) with an $N_2SA$ of 100 $m^2/g$ or less and at least one silica (2) with an $N_2SA$ of 180 $m^2/g$ or more; the combined amount of silicas (1) and (2) is 30-150 parts by mass per 100 parts by mass of the rubber component; and the amounts of silicas (1) and (2) satisfy:

[Amount of silica (1)]×0.2≤[Amount of silica (2)]≤ [Amount of silica (1)]×6.5.

2 Claims, No Drawings

RUBBER COMPOSITION FOR STUDLESS WINTER TIRES, AND STUDLESS WINTER TIRE

TECHNICAL FIELD

The present invention relates to a rubber composition for studless winter tires and a studless winter tire.

BACKGROUND ART

In order to drive on snowy and icy roads, studded tires and chains to be wrapped around tires were used. They, however, cause environmental issues such as dust pollution. Therefore, studless winter tires have been developed as alternative tires for snowy and icy roads. Studless winter tires, which are used on snowy and icy roads having higher surface roughness than normal roads, have improved in materials and designs. For example, proposed is a rubber composition containing a diene rubber that is excellent in low-temperature characteristics, and an increased amount of a softener for enhancing a softening effect. The softener generally used is mineral oil because it enhances low-temperature characteristics.

An increased amount of mineral oil for improving low-temperature characteristics, however, usually deteriorates abrasion resistance. One of measures to solve this problem is replacing mineral oil with aromatic oil. However, this method reduces low-temperature characteristics, and thus sufficient performance on ice and snow is difficult to achieve. Meanwhile, using aromatic oil together with silica can improve low-temperature characteristics without reducing abrasion resistance. The resulting properties, however, are still at insufficient levels. Moreover, improved wet grip performance is also desired in addition to improvements in low-temperature characteristics and abrasion resistance.

For example, Patent Literature 1 discloses a rubber composition for studless winter tires, which contains large amounts of aromatic oil and silica and thereby achieves a balanced improvement in abrasion resistance, performance on ice and snow, and wet grip performance. However, further improvements in these properties have recently become required.

CITATION LIST

Patent Literature

Patent Literature 1: JP 2011-38057 A

SUMMARY OF INVENTION

Technical Problem

The present invention aims to solve the above problems and to provide: a rubber composition for studless winter tires, which can achieve a balanced improvement in performance on ice and snow, wet grip performance, and abrasion resistance; and a studless winter tire including a tread formed from the rubber composition.

Solution to Problem

The present invention relates to a rubber composition for studless winter tires, including: a rubber component that includes natural rubber and butadiene rubber; an aromatic oil; silica; and carbon black, wherein a combined amount of the natural rubber and the butadiene rubber is 30 mass % or more based on 100 mass % of the rubber component; an amount of the aromatic oil is 12 to 85 parts by mass relative to 100 parts by mass of the rubber component; a silica content is 45 mass % or more based on 100 mass % in total of the silica and the carbon black; the silica includes one or more kinds of silica (1) with a nitrogen adsorption specific surface area of 100 $m^2/g$ or less and one or more kinds of silica (2) with a nitrogen adsorption specific surface area of 180 $m^2/g$ or more; a combined amount of the silica (1) and the silica (2) is 30 to 150 parts by mass relative to 100 parts by mass of the rubber component; and an amount of the silica (1) and an amount of the silica (2) satisfy the following relation:

[Amount of silica (1)]×0.2≤[Amount of silica (2)]≤ [Amount of silica (1)]×6.5.

The present invention also relates to a studless winter tire, including a tread including the rubber composition.

Advantageous Effects of Invention

The present invention provides a rubber composition for studless winter tires, including a rubber component that includes natural rubber and butadiene rubber; an aromatic oil; silica; and carbon black, wherein the combined amount of the natural rubber and the butadiene rubber is 30 mass % or more based on 100 mass % of the rubber component; the amount of the aromatic oil is 12 to 85 parts by mass relative to 100 parts by mass of the rubber component; the silica content is 45 mass % or more based on 100 mass % in total of the silica and the carbon black; the silica includes one or more kinds of silica (1) with a nitrogen adsorption specific surface area of 100 $m^2/g$ or less and one or more kinds of silica (2) with a nitrogen adsorption specific surface area of 180 $m^2/g$ or more; the combined amount of the silica (1) and the silica (2) is 30 to 150 parts by mass relative to 100 parts by mass of the rubber component; and the amounts of the silica (1) and the silica (2) satisfy a specific relation. Thus, the use of this rubber composition in a tread enables to provide a studless winter tire achieving a balanced improvement in performance on ice and snow, wet grip performance, and abrasion resistance, and particularly in performance on ice and snow and wet grip performance.

DESCRIPTION OF EMBODIMENTS

The rubber composition of the present invention includes certain amounts of natural rubber, butadiene rubber, an aromatic oil, silica, and carbon black, and the silica includes silica (1) and silica (2) having nitrogen adsorption specific surface areas within specific ranges. When two or more kinds of silica (silicas (1) and (2)) with different nitrogen adsorption specific surface areas are added to a rubber including a certain amount of an aromatic oil and the like as described, a balanced improvement in performance on ice and snow, wet grip performance, and abrasion resistance can be achieved at a higher level (performance on ice and snow and wet grip performance can be further improved while maintaining good abrasion resistance). Moreover, the properties can be greatly improved as compared to when two or more kinds of silica with different nitrogen adsorption specific surface areas are added to a rubber composition that does not include certain amounts of an aromatic oil and silica. In particular, if silica included in a rubber composition including a mineral oil as oil is replaced with two or more kinds of silica with different nitrogen adsorption specific surface areas, then the rubber composition ends up having reduced wet grip performance and abrasion resistance.

(Rubber Component)

For the rubber component in the present invention, natural rubber and butadiene rubber are used in combination. This improves low-temperature characteristics, thereby enhancing performance on ice and snow. Butadiene rubber is particularly an important component for ensuring performance on ice and snow.

The natural rubber (NR) may be a typical natural rubber in the tire industry, such as SIR20, RSS#3, or TSR20. Examples of natural rubber (NR) include modified natural rubbers such as deproteinized natural rubber (DPNR), highly purified natural rubber (HPNR), epoxidized natural rubber (ENR), hydrogenated natural rubber (HNR), and grafted natural rubber. These may be used alone, or two or more of these may be used in combination.

The butadiene rubber (BR) preferably has a cis content of 80 mass % or more. This increases abrasion resistance. The cis content is more preferably 85 mass % or more, and still more preferably 90 mass % or more, and most preferably 95 mass % or more.

The BR preferably has a viscosity measured as a 5 mass % solution in toluene at 25° C. of 30 cps or more. A viscosity less than 30 cps may lead to greatly poor processability as well as poor abrasion resistance. The viscosity of the solution in toluene is preferably 100 cps or less, and more preferably 70 cps or less. A viscosity of more than 100 cps may end up in poor processability.

Furthermore, the BR preferably has an Mw/Mn of 3.0 to 3.4 because such BR simultaneously improves processability and abrasion resistance. The weight average molecular weight (Mw) and the number average molecular weight (Mn) can be determined by gel permeation chromatography (GPC) (GPC-8000 series produced by TOSOH CORPORATION, detector: differential refractometer, column: TSK-GEL SUPERMALTPORE HZ-M produced by TOSOH CORPORATION) relative to polystyrene standards.

Examples of BR include, but not limited to, BRs with a high cis content, such as BR1220 produced by ZEON CORPORATION and BR130B and BR150B, both produced by Ube Industries, Ltd.; and BRs with syndiotactic polybutadiene crystals, such as VCR412 and VCR617, both produced by Ube Industries, Ltd.

The amount of NR based on 100 mass % of the rubber component is preferably 30 mass % or more, more preferably 40 mass % or more, and still more preferably 50 mass % or more, and particularly preferably 55 mass % or more. An amount less than 30 mass % may result in greatly reduced tensile strength at break, making it difficult to ensure abrasion resistance. The amount of NR is preferably 80 mass % or less, more preferably 70 mass % or less, and still more preferably 65 mass % or less. An amount more than 80 mass % may reduce low-temperature characteristics enough to make it impossible to ensure the required performance on ice and snow for studless winter tires.

The amount of BR based on 100 mass % of the rubber component is preferably 10 mass % or more, more preferably 20 mass % or more, still more preferably 30 mass % or more, and particularly preferably 35 mass % or more. An amount of 10 mass % or more enables studless winter tires to achieve their required performance on ice and snow. The amount of BR is preferably 80 mass % or less, more preferably 70 mass % or less, still more preferably 60 mass % or less, and particularly preferably 50 mass % or less. An amount more than 80 mass % may cause great deterioration in processability and occurrence of whitening due to bleeding of chemical agents.

The combined amount of NR and BR based on 100 mass % of the rubber component is 30 mass % or more, preferably 60 mass % or more, more preferably 80 mass % or more, and most preferably 100 mass %. A higher combined amount of NR and BR can lead to better low-temperature characteristics and thus contribute to the required performance on ice and snow.

The rubber component may include other rubber materials unless they impair the effects of the prevent invention. Examples of other rubber materials include styrene butadiene rubber (SBR), isoprene rubber (IR), ethylene propylene diene rubber (EPDM), chloroprene rubber (CR), acrylonitrile butadiene rubber (NBR), butyl rubber (IIR), and halogenated butyl rubber (X-IIR).

(Oil)

In the present invention, relatively a large amount of an aromatic oil is used. The use of a mineral oil, which has excellent low-temperature characteristics, can ensure performance on ice and snow, but deteriorates abrasion resistance. Reducing the amount of mineral oil can ensure abrasion resistance but reduces low-temperature characteristics to reduce performance on ice and snow. Thus, performance on ice and snow and abrasion resistance, which are competing properties, cannot be simultaneously achieved. In contrast, the use of an aromatic oil in a large amount only slightly reduces ablation resistance, and therefore performance on ice and snow and abrasion resistance can be simultaneously achieved. Further, when an aromatic oil is used together with a large amount of silica (silicas (1) and (2)) and carbon black, the resulting composition simultaneously has higher levels of performance on ice and snow and abrasion resistance, as well as good wet grip performance.

In the present invention, the aromatic oil may suitably be an aromatic oil having an aromatic hydrocarbon content of 15 mass % or more as determined in conformity with ASTM D2140, for example. More specifically, process oils, which include aromatic hydrocarbons ($C_A$), paraffinic hydrocarbons ($C_P$), and naphthenic hydrocarbons ($C_N$) based on their molecular structures, are roughly categorized into aromatic oils, paraffinic oils, and naphthenic oils according to the contents $C_A$ (mass %), $C_P$ (mass %), and $C_N$ (mass %). In the present invention, the aromatic oil preferably has a $C_A$ content of 15 mass % or more, and more preferably 17 mass % or more. The aromatic oil preferably has a $C_A$ content of 70 mass % or less, more preferably 65 mass % or less, and still more preferably 50 mass % or less.

Examples of commercial products of the aromatic oils include AC-12, AC-460, AH-16, AH-24, and AH-58, all produced by Idemitsu Kosan Co., Ltd.; and Process NC300S produced by JX Nippon Oil & Energy Corporation.

The amount of aromatic oil relative to 100 parts by mass of the rubber component is 12 parts by mass or more, preferably 15 parts by mass or more, more preferably 30 parts by mass or more, still more preferably 45 parts by mass or more, and particularly preferably 60 parts by mass or more. A larger amount of aromatic oil is more effective for softening to enhance low-temperature characteristics, thus improving performance on ice and snow. The amount of aromatic oil is 85 parts by mass or less, and preferably 80 parts by mass or less. An amount more than 85 parts by mass may deteriorate processability, and reduce abrasion resistance and aging properties, and the like.

(Silica)

The silica used in the rubber composition of the present invention includes one or more kinds of silica (1) with a nitrogen adsorption specific surface area of 100 m$^2$/g or less and one or more kinds of silica (2) with a nitrogen adsorption specific surface area of 180 m$^2$/g or more.

The use of relatively a large amount of silica (1) and silica (2) with the aromatic oil can simultaneously provide abrasion resistance and performance on ice and snow, and at same time can enhance wet grip performance, which has been considered to be a drawback of studless winter tires.

The rubber composition of the present invention may include other kinds of silica than silica (1) and silica (2) unless they impair the effects of the present invention.

Examples of silica (1) and silica (2) include silica (anhydrous silica) prepared by a dry process, and silica (hydrous silica) prepared by a wet process. Preferred is silica prepared by a wet process because it has a large amount of silanol groups on the surface, which provide many reaction points to silane coupling agents.

The silica (1) has a nitrogen adsorption specific surface area (N$_2$SA) of 100 m$^2$/g or less, preferably 80 m$^2$/g or less, and more preferably 60 m$^2$/g or less. Blending a silica (1) with a N$_2$SA greater than 100 m$^2$/g with silica (2) provides a small effect. The silica (1) preferably has a N$_2$SA of 20 m$^2$/g or more, and more preferably 30 m$^2$/g or more. If a silica (1) with a N$_2$SA less than 20 m$^2$/g is used, the resulting rubber composition tends to have reduced tensile strength at break and to have poor abrasion resistance and handling stability.

The N$_2$SA of silica herein can be determined by the BET method in conformity with ASTM D3037-81.

The silica (1) is not particularly limited as long as it has a nitrogen adsorption specific surface area of 100 m$^2$/g or less, and examples thereof include ULTRASIL 360 produced by Degussa, and Z40 and RP80, both produced by Rhodia. These silicas (1) may be used alone, or two or more kinds thereof may be used in combination.

The amount of silica (1) relative to 100 parts by mass of the rubber component is preferably 10 parts by mass or more, more preferably 20 parts by mass or more, still more preferably 35 parts by mass or more, and particularly preferably 50 parts by mass or more. The use of silica (1) in an amount less than 10 parts by mass tends to fail to sufficiently provide performance on ice and snow and wet grip performance. The amount of silica (1) is preferably 120 parts by mass or less, and more preferably 80 parts by mass or less. The use of silica (1) in an amount more than 120 parts by mass tends to reduce performance on ice and snow and abrasion resistance although it enhances wet grip performance.

The silica (2) has a N$_2$SA of 180 m$^2$/g or more, preferably 190 m$^2$/g or more, and more preferably 200 m$^2$/g or more. Blending a silica (2) with a N$_2$SA less than 180 m$^2$/g with silica (1) provides a small effect. The silica (2) preferably has a N$_2$SA of 300 m$^2$/g or less, more preferably 240 m$^2$/g or less, and still more preferably 220 m$^2$/g or less. The use of a silica (2) with a N$_2$SA greater than 300 m$^2$/g tends to reduce the dispersibility of silica and abrasion resistance as well as tending to deteriorate processability.

The silica (2) is not particularly limited as long as it has a nitrogen adsorption specific surface area of 180 m$^2$/g or more, and examples thereof include Zeosil 1205 MP produced by Rhodia. These silicas (2) may be used alone, or two or more kinds thereof may be used in combination.

The amount of silica (2) relative to 100 parts by mass of the rubber component is preferably 5 parts by mass or more, and more preferably 10 parts by mass or more. The use of silica (2) in an amount less than 5 parts by mass tends to fail to provide sufficient wet grip performance. The amount of silica (2) is preferably 100 parts by mass or less, more preferably 60 parts by mass or less, still more preferably 50 parts by mass or less, and particularly preferably 30 parts by mass or less. The use of silica (2) in an amount more than 100 parts by mass tends to greatly deteriorate processability.

The combined amount of silica (1) and silica (2) relative to 100 parts by mass of the rubber component is 30 parts by mass or more, preferably 40 parts by mass or more, and more preferably 50 parts by mass or more. If the combined amount of silica (1) and silica (2) is less than 30 parts by mass, such a blend of silica (1) and silica (2) fails to provide a sufficient reinforcing effect. The combined amount of silica (1) and silica (2) is 150 parts by mass or less, preferably 120 parts by mass or less, and more preferably 100 parts by mass or less. A combined amount of silica (1) and silica (2) of more than 150 parts by mass makes it difficult to disperse silica uniformly in the rubber composition, which reduces the abrasion resistance of the rubber composition as well as deteriorating the processability.

The amounts of silica (1) and silica (2) satisfy the following relation:

[Amount of silica (1)]×0.2≤[Amount of silica (2)]≤[Amount of silica (1)]×6.5.

The amount of silica (2) is 0.2 times or more, preferably 0.5 times or more, of the amount of silica (1). The use of silica (2) in an amount less than 0.2 times of the amount of silica (1) results in reduced abrasion resistance. The amount of silica (2) is 6.5 times or less, preferably 4 times or less, and more preferably the same (1 time) or less, of the amount of silica (1). The use of silica (2) in an amount more than 6.5 times of the amount of silica (1) reduces processability.

(Silane Coupling Agent)

In the present invention, the silica is preferably used with a silane coupling agent. The silane coupling agent is not particularly limited, and may be a conventional silane coupling agent generally used in the tire field. Examples thereof include sulfide silane coupling agents, mercapto silane coupling agents, vinyl silane coupling agents, amino silane coupling agents, glycidoxy silane coupling agents, nitro silane coupling agents, and chloro silane coupling agents. Suitable examples are sulfide silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide. Preferred among these, for the effect of improving the reinforcement of the rubber composition and the like, are bis(3-triethoxysilylpropyl)tetrasulfide and 3-trimethoxysilylpropyl benzothiazolyl tetrasulfide. These silane coupling agents may be used alone, or two or more of these may be used in combination.

The amount of silane coupling agent is preferably 1 part by mass or more, and more preferably 2 parts by mass or more, relative to 100 parts by mass of silica. The use of a silane coupling agent in an amount less than 1 part by mass tends to increase the viscosity of the unvulcanized rubber composition, thus deteriorating processability. The amount of silane coupling agent is preferably 20 parts by mass or less, and more preferably 15 parts by mass or less, relative to 100 parts by mass of silica. The use of a silane coupling agent in an amount more than 20 parts by mass tends not to provide an effect commensurate with the amount, and tends to drive up the cost.

(Carbon Black)

The rubber composition of the present invention includes carbon black. The use of carbon black provides reinforcement. Moreover, adding carbon black together with the aromatic oil and silica (silicas (1) and (2)) to the NR and BR enables a balanced improvement in abrasion resistance, performance on ice and snow, and wet grip performance. The carbon black is not particularly limited, and examples thereof include SAF, ISAF, HAF, FF, and GPF.

The carbon black preferably has an average particle size of 31 nm or smaller and/or a DBP oil absorption of 100 mL/100 g or more. The use of such a carbon black can provide required reinforcement for ensuring block rigidity, uneven wear resistance, and tensile strength at break. Furthermore, the effects of the present invention can then be well achieved.

The use of a carbon black with an average particle size greater than 31 nm may result in greatly poor tensile strength at break, making it difficult to ensure abrasion resistance. The carbon black more preferably has an average particle size of 25 nm or smaller, still more preferably 23 nm or smaller. The carbon black preferably has an average particle size of 15 nm or greater, more preferably 19 nm or greater. If the average particle size is smaller than 15 nm, the resulting rubber compound may have a greatly increased viscosity and poor processability. In the present invention, average particle size refers to a number average particle size, which can be measured by a transmission electron microscope.

The use of a carbon black with a DBP oil absorption (dibutyl phthalate oil absorption) of less than 100 mL/100 g may provide low reinforcement, making it difficult to ensure abrasion resistance. The DBP oil absorption is more preferably 105 mL/100 g or more, and still more preferably 110 mL/100 g or more. The DBP oil absorption is preferably 160 mL/100 g or less, more preferably 150 mL/100 g or less, and still more preferably 140 mL/100 g or less. A carbon black with a DBP oil absorption more than 160 mL/100 g itself is difficult to prepare.

The DBP oil absorption of carbon black can be measured according to the method shown in JIS K6217-4:2001.

The carbon black preferably has a nitrogen adsorption specific surface area ($N_2SA$) of 80 $m^2$/g or more, more preferably 110 $m^2$/g or more. The use of a carbon black with a $N_2SA$ less than 80 $m^2$/g may result in greatly poor tensile strength at break, making it difficult to ensure abrasion resistance. The $N_2SA$ of carbon black is preferably 200 $m^2$/g or less, and more preferably 150 $m^2$/g or less. If the $N_2SA$ is more than 200 $m^2$/g, the resulting rubber compound may have a greatly increased viscosity and poor processability.

The $N_2SA$ of carbon black can be determined according to JIS K6217-2:2001.

The amount of carbon black relative to 100 parts by mass of the rubber component is preferably 2 parts by mass or more, more preferably 3 parts by mass or more, and still more preferably 5 parts by mass or more. An amount less than 2 parts by mass may result in greatly poor weather resistance and ozone resistance. The amount thereof is preferably 50 parts by mass or less, more preferably 30 parts by mass or less, still more preferably 20 parts by mass or less, and particularly preferably 15 parts by mass or less. An amount more than 50 parts by mass may deteriorate low-temperature characteristics enough to make it impossible to ensure the required performance on ice and snow for studless winter tires.

The silica content (preferably the combined content of silica (1) and silica (2)) based on 100 mass % in total of silica (preferably silicas (1) and (2)) and carbon black is preferably 45 mass % or more, more preferably 60 mass % or more, still more preferably 85 mass % or more, and particularly preferably 90 mass % or more, whereas it is preferably 98 mass % or less, and more preferably 96 mass % or less. When the silica content falls within the range mentioned above, a balanced improvement in performance on ice and snow, wet grip performance, and abrasion resistance can be achieved at a high level.

(Other Compounding Agents)

The rubber composition may include, in addition to the above-mentioned components, compounding agents conventionally used in the rubber industry, such as other fillers, stearic acid, antioxidants, age resisters, zinc oxide, peroxides, vulcanizing agents (e.g. sulfur, sulfur-containing compounds), and vulcanization accelerators.

The rubber composition of the present invention can be suitably used for treads of studless winter tires. The rubber composition may also be used for trucks, buses, and the like, and is particularly preferably used for studless winter tires of passenger vehicles which are importantly required to have handling stability on snow and ice.

The studless winter tire of the present invention can be produced by a conventional method using the rubber composition mentioned above. Specifically, the unvulcanized rubber composition optionally including various additives is extruded into the shape of a tire component such as a tread, formed on a tire building machine in a conventional manner, and assembled with other tire components to build an unvulcanized tire; and then the unvulcanized tire is heat-pressurized in a vulcanizer to produce a tire.

EXAMPLES

Hereinafter, the present invention will be described in more detail with reference to examples. The examples are not intended to limit the scope of the present invention.

The chemicals used in The examples and comparative examples are listed in the following.

NR: RSS#3

BR: BR150B (cis content: 97 mass %, $ML_{1+4}$ (100° C.): 40, viscosity of a 5 mass % solution in toluene at 25° C.: 48 cps, Mw/Mn: 3.3) produced by Ube Industries, Ltd.

Carbon black: N220 ($N_2SA$: 120 $m^2$/g, average particle size: 23 nm, DBP oil absorption: 115 mL/100 g) produced by Cabot Japan K. K.

Silica (1): ULTRASIL 360 ($N_2SA$: 50 $m^2$/g) produced by Degussa

Silica (2): Zeosil 1205 MP ($N_2SA$: 200 $m^2$/g) produced by Rhodia

Silica (3): Ultrasil VN3 ($N_2SA$: 175 $m^2$/g) produced by Degussa

Silane coupling agent: Si69 (bis(3-triethoxysilylpropyl) tetrasulfide) produced by Degussa Mineral oil: PS-32 (paraffinic process oil) produced by Idemitsu Kosan Co., Ltd.

Aromatic oil: process oil NC300S (aromatic hydrocarbon content ($C_A$): 29 mass %) produced by JX Nippon Oil & Energy Corporation Stearic acid: Kiri produced by NOF Corporation Zinc oxide: zinc oxide #2 produced by Mitsui Mining and Smelting Co., Ltd.

Antioxidant: NOCRAC 6C (N-(1,3-dimethylbutyl)-N'-phenyl-p-phenylenediamine) produced by Ouchi Shinko Chemical Industrial Co., Ltd.

Wax: OZOACE wax produced by Nippon Seiro Co., Ltd.

Sulfur: powdered sulfur produced by Tsurumi Chemical Industry Co., Ltd.

Vulcanization accelerator TBBS: Nocceler NS (N-tert-butyl-2-benzothiazolyl sulfenamide) produced by Ouchi Shinko Chemical Industrial Co., Ltd.

Vulcanization accelerator DPG: Nocceler D (N,N'-diphenylguanidine) produced by Ouchi Shinko Chemical Industrial Co., Ltd.

Examples 1 to 5 and Comparative Examples 1 to 3

Chemicals in amounts shown in step 1 of Table 1 were charged and kneaded in a Banbury mixer for five minutes such that the discharge temperature was about 150° C. Then, sulfur and vulcanization accelerators in amounts shown in step 2 were added to the mixture obtained from step 1, and the resulting mixture was kneaded for three minutes at about 80° C. in an open roll mill to produce an unvulcanized rubber composition. The obtained unvulcanized rubber composition was press vulcanized at 170° C. for ten minutes, thus preparing a vulcanized rubber composition (vulcanized rubber sheet).

Separately, the obtained unvulcanized rubber composition was formed into a tread shape and assembled with other tire components. The assembly was vulcanized at 170° C. for 15 minutes to prepare a test studless winter tire (tire size: 195/65R15, a DS-2 studless winter tire for passenger vehicles).

The unvulcanized rubber composition, vulcanized rubber sheet, and test studless winter tire of each case were evaluated by the following methods.

<Hardness>

The hardness of the vulcanized rubber sheet was determined at 0° C. by a Type A durometer according to "Rubber, vulcanized or thermoplastic—Determination of hardness" in JIS K6253:2006. The result is expressed as an index relative to that of Comparative Example 1 (=100). A lower index indicates that the vulcanized rubber sheet is softer and has better performance on ice and snow.

<Glass Transition Temperature (Tg)>

Test pieces in a predetermined size were prepared from the vulcanized rubber sheet. The tan δ of the test pieces were measured at temperatures ranging from −100° C. to 100° C. by a viscoelasticity spectrometer VES produced by Iwamoto Seisakusho Co., Ltd. at an initial strain of 10%, a dynamic strain of 0.5%, a frequency of 10 Hz and an amplitude of ±0.25%, and a rate of temperature increase of 2° C./min, to generate a temperature dependence curve. From the curve, the tan δ peak temperature was determined and taken as Tg.

<Performance on Ice and Snow>

The test studless winter tires of each case were mounted on a 2000 cc domestic FR (front-engine rear-wheel-drive) car. The performance of the car was evaluated on ice and snow under the following conditions. The test was performed on a test course of Sumitomo Rubber Industries, Ltd. in Nayoro, Hokkaido. The temperature on ice was −1° C. to −6° C. and the temperature on snow was −2° C. to −10° C.

The braking performance (braking distance on ice) of the car, that is, the stopping distance travelled on ice from applying the brakes that lock up, at 30 km/h until the car stopped was measured. The result is expressed as an index relative to that of Comparative Example 1 regarded as a reference, according to the following formula.

(Index of performance on ice and snow)=(braking distance of Comparative Example 1)/(braking distance of each case)×100

A higher index indicates that the tire has better braking performance on ice and snow.

<Wet Grip Performance>

A car with the test studless winter tires of each case was driven on a test course with a wet asphalt surface. The grip performance (road-gripping feeling, brake performance, traction performance) during the driving was sensory evaluated.

Regarding the sensory evaluation, the grip performance of each case was rated relative to that of Comparative Example 1 (=100) in such a manner that tires were rated 140 if the test driver judged that their performance was obviously improved; and tires were rated 140 if the test driver judged that their performance was at a high level never seen before.

<Abrasion Resistance>

The test studless winter tires (tire size: 195/65R15) of each case were mounted on a domestic FF (front-engine front-wheel-drive) car. The groove depth in a tire tread was measured after 8000 km traveling. From the measured value, the mileage at which the groove depth was decreased by 1 mm in the tire was calculated and expressed as an index according to the following formula.

(Abrasion resistance index)=(the mileage at which the groove depth was decreased by 1 mm in each case)/(the mileage at which the groove depth was decreased by 1 mm in the tire of Comparative Example 1)×100

A higher index indicates better abrasion resistance.

TABLE 1

|  |  |  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|---|---|
| Composition (part(s) by mass) | Step 1 | NR | 60 | 60 | 60 | 60 | 60 | 60 | 60 | 60 |
|  |  | BR | 40 | 40 | 40 | 40 | 40 | 40 | 40 | 40 |
|  |  | Carbon black | 5 | 5 | 5 | 5 | 13 | 5 | 20 | 20 |
|  |  | Silica (1) | 45 | 15 | 60 | 20 | 15 | — | — | 5 |
|  |  | Silica (2) | 15 | 45 | 20 | 60 | 37 | — | — | 15 |
|  |  | Silica (3) | — | — | — | — | — | 60 | 20 | — |
|  |  | Silane coupling agent | 4.8 | 4.8 | 6.4 | 6.4 | 4.8 | 4.8 | 1.6 | 1.6 |
|  |  | Mineral oil | — | — | — | — | — | — | 20 | 20 |
|  |  | Aromatic oil | 60 | 60 | 80 | 80 | 60 | 60 | — | — |
|  |  | Stearic acid | 2 | 2 | 2 | 2 | 2 | 2 | 2 | 2 |
|  |  | Zinc oxide | 3 | 3 | 3 | 3 | 3 | 3 | 3 | 3 |
|  |  | Antioxidant | 2 | 2 | 2 | 2 | 2 | 2 | 2 | 2 |
|  |  | Wax | 2 | 2 | 2 | 2 | 2 | 2 | 2 | 2 |
|  | Step 2 | Sulfur | 1.5 | 1.5 | 1.5 | 1.5 | 1.5 | 1.5 | 1.5 | 1.5 |
|  |  | Vulcanization accelerator TBBS | 1.5 | 1.5 | 1.5 | 1.5 | 1.5 | 1.5 | 1.5 | 1.5 |
|  |  | Vulcanization accelerator DPG | 1.0 | 1.0 | 1.0 | 1.0 | 1.0 | 1.0 | 1.0 | 1.0 |

TABLE 1-continued

|  |  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|---|
| Evaluation | Hardness (0° C.) | 95 | 98 | 97 | 100 | 99 | 100 | 100 | 99 |
|  | Tg (° C.) | −65 | −65 | −67 | −67 | −65 | −65 | −60 | −60 |
|  | Performance on ice and snow (index) | 110 | 105 | 109 | 104 | 101 | 100 | 105 | 106 |
|  | Wet grip performance (index) | 115 | 110 | 125 | 120 | 105 | 100 | 80 | 75 |
|  | Abrasion resistance (index) | 100 | 100 | 100 | 100 | 105 | 100 | 60 | 55 |

As shown in Table 1, a balanced improvement in performance on ice and snow, wet grip performance, and abrasion resistance was achieved in the examples using certain amounts of natural rubber, butadiene rubber, an aromatic oil, carbon black, and silica including certain amounts of silicas (1) and (2) having nitrogen adsorption specific surface areas within specific ranges. In contrast, from the results of Comparative Examples 2 and 3, the wet grip performance and the abrasion resistance were reduced when silica included in a rubber composition including a mineral oil was replaced with two or more kinds of silica with different nitrogen adsorption specific surface areas.

The invention claimed is:

1. A rubber composition for studless winter tires, comprising:
    a rubber component that comprises natural rubber and butadiene rubber;
    an aromatic oil;
    silica; and
    carbon black,
    wherein a combined amount of the natural rubber and the butadiene rubber is 30 mass % or more based on 100 mass % of the rubber component;
    an amount of the butadiene rubber is 20-60 mass % based on 100 mass % of the rubber component;
    an amount of the natural rubber is 40-80 mass % based on 100 mass % of the rubber component;
    an amount of the aromatic oil is 12 to 85 parts by mass relative to 100 parts by mass of the rubber component;
    a silica content is 45 mass % or more based on 100 mass % in total of the silica and the carbon black;
    the silica comprises one or more kinds of silica (1) with a nitrogen adsorption specific surface area of 100 m$^2$/g or less and one or more kinds of silica (2) with a nitrogen adsorption specific surface area of 180 m$^2$/g or more;
    a combined amount of the silica (1) and the silica (2) is 30 to 150 parts by mass relative to 100 parts by mass of the rubber component; and
    an amount of the silica (1) and an amount of the silica (2) satisfy the following relation:

[Amount of silica (1)]×0.2≤[Amount of silica (2)]≤ [Amount of silica (1)]×6.5.

2. A studless winter tire, comprising a tread comprising the rubber composition according to claim 1.

* * * * *